United States Patent [19]
Shirota et al.

[11] Patent Number: 5,524,264
[45] Date of Patent: Jun. 4, 1996

[54] PARALLEL ARITHMETIC-LOGIC PROCESSING DEVICE

[75] Inventors: Norihisa Shirota, Kanagawa; Yasunobu Kato; Noboru Oya, both of Tokyo, all of Japan

[73] Assignee: Sony Corporation, Tokyo, Japan

[21] Appl. No.: 209,105

[22] Filed: Mar. 9, 1994

[30]    Foreign Application Priority Data

Mar. 11, 1993 [JP] Japan .................... 5-050544

[51] Int. Cl.⁶ .................... G06F 15/76
[52] U.S. Cl. .............. 395/800; 364/229; 364/230; 364/230.3; 364/228.3; 364/DIG. 1
[58] Field of Search ............. 395/800; 364/758, 364/754, 750.5

[56]          References Cited

U.S. PATENT DOCUMENTS

| | | | |
|---|---|---|---|
| 4,314,349 | 2/1982 | Batcher | 364/716 |
| 4,521,851 | 6/1985 | Trubisky | 395/800 |
| 4,594,651 | 6/1986 | Jaswa | 364/131 |
| 5,155,820 | 10/1992 | Gibson | 395/375 |
| 5,253,308 | 10/1993 | Johnson | 382/49 |

*Primary Examiner*—Eric Coleman
*Attorney, Agent, or Firm*—Limbach & Limbach

[57]          ABSTRACT

A parallel arithmetic-logical processing device in which arithmetic-logical processing is shared among and executed in a parallel fashion by a plurality of processing elements. The device includes a large-capacity serial access memory for continuous reading/writing of large-scale data, a small-capacity serial access memory for continuous reading/writing of small-scale data and a high-speed general-purpose random access memory for random writing/readout of small-scale data. A central processing unit (CPU) causes the memories to be used or not used depending on the scale of the arithmetic-logical processing. Since the serial access memory executes continuous data writing and reading, high-speed access may be achieved, so that it can be manufactured inexpensively with a large storage capacity. Consequently, the processing speed in the CPU may be increased, while the parallel arithmetic-logical processing device may be manufactured inexpensively.

14 Claims, 11 Drawing Sheets

PARALLEL ARITHMETIC-LOGIC PROCESSING DEVICE

BACKGROUND OF THE INVENTION

This invention relates to a parallel arithmetic-logic processing device which may be conveniently employed as a computer for executing arithmetic operations in the fields of science and technology. More particularly, it relates to a parallel arithmetic-logic processing device in which, since matrix data having a voluminous data volume is frequently employed in the scientific and technical arithmetic/logic operations, a memory device for continuous data writing and reading is provided as storage means for writing and reading the matrix data for reducing the processing time and production costs.

It is not too much to state that recent development in technology is ascribable to enablement of the complex and large-scale scientific and technological calculations. In the course of the scientific and technological calculations, matrix operations, such as solution of extremely large size first-order simultaneous equations or calculation of eigenvalues of the matrices occur frequently. For the size (row by column) of the matrices of n×n, for example, the volume of the processing operations becomes equal to $O(n^3)$ for any of the calculations of the first-order simultaneous equations having the matrices as the coefficients, calculations of the inverse matrix, calculations of the eigenvalue of the matrix or the calculations of the eigenvector. Thus, if the number of the rows and/or the columns, that is the value of n, is increased, the volume of the processing operations is necessarily increased.

It is up to the today's computer to execute the voluminous operations quickly.

Although the processing speed of the central processing unit (CPU) of the up-to-date computer has been increased tremendously, it takes some prolonged time to have access to the memory, thus retarding the overall processing speed of the computer.

For possibly reducing the time necessary for having access to the memory, a computer has been developed in which a subsidiary memory known as a cache memory 102 capable of high-speed access despite its smaller storage capacity than that of a main memory 103 is provided between the CPU 101 and the main memory 103, as shown in FIG. 14.

With such computer, the necessary data is previously read out from the main memory 103 to the cache memory 102 over a bus line 105 so that the necessary data is read from the cache memory 102. Since the cache memory 102 permits of high-speed accessing, the processing operations may be executed more quickly.

On the other hand, there is known a so-called supercomputer having plural vector registers 117 for executing the same processing operations on lumped data, such as matrix operations, as shown in FIG. 15. For directly processing data contained in the vector registers 117, plural registers capable of directly accessing an adder for floating decimal point additive operations 110, a multiplier for a floating decimal point multiplicative operations 111 and a divider for a floating decimal point dividing operations 112 are arrayed in a one-dimensional pattern.

Before the above-described supercomputer proceeds to the processing operations, data is pre-loaded from the main memory 121 to the vector registers 117 via data lines 118, 120 by the operations of a vector input/output circuit 119.

The data loaded into the vector registers 117 is supplied over an input busline 113 to the arithmetic-logic units 110 to 112 to execute the processing operations. The processed data is supplied over an output busline 114 to the vector registers 117 so as to be re-written therein. The processed data, thus re-written in the vector registers 117, are read out by the vector input/output circuit 119 so as to be stored in the main memory 121.

With the supercomputer, arithmetic-logic operations may be executed in a lumped fashion by the vector registers 117. Besides, high-speed processing is rendered possible because of the pipelined operation up to storage of the processed data in the main memory 121.

However, with a computer employing such cache memory 102 as shown in FIG. 14, part of the entire data is stored in the cache memory 102, while the remaining data is stored in the main memory 103 in carrying out the processing operations. Consequently, if data necessary for the processing operations is not stored in the cache memory 102 by so-called mis-hit, it becomes necessary to read out data stored in the main memory 103 while the CPU 101 is in the stand-by state. As a result thereof, large-scale calculating operations cannot be executed quickly.

Besides, with the supercomputer shown in FIG. 15, the vector registers 117 are generally limited in capacities, so that, if desired to execute large-scale processing operations, it is not possible to store the entire data in the vector registers 117. Thus the data that cannot be stored in the vector registers 117 need to be read from the main memory 121 for storage in the vector registers 117. Since a lot of time is involved in reading out and storing the excess data, large-scale calculating operations cannot be executed quickly.

Meanwhile, the above problems may be overcome by providing, as the cache memory 102 and the vector registers 117, a subsidiary memory of a large storage capacity accessible at a high speed. However, such large capacity subsidiary memory accessible at the high speed is in need of a large mounting area and is expensive to increase the size and production costs of the computer.

OBJECT AND SUMMARY OF THE INVENTION

In view of the above-described problems of the prior art, it is an object of the present invention to provide a parallel arithmetic-logical processing device in which a large-scale arithmetic-logical operation may be executed at a high speed and which nevertheless may be reduced in size and production costs.

The present invention provides a parallel arithmetic-logical processing device in which data to be processed is divided into first data and second data by control means and supplied to a plurality of processing units so as to be parallel-processed by the processing units. These processing units include first storage means for continuous writing and readout of the first data, second storage means for continuous writing and readout of the second data, processing means for executing arithmetic-logical processing operations on the first data read out from the first storage means and on the second data read out from the second storage means, communication means for supplying the first data and second data from the control means to the first storage means and second storage means and for supplying processed data from the processing means to the control means, and communication control means for controlling data input/output to or from the communication means.

The first data is the matrix data and the second data is the vector data.

The first memory means is a serial access memory for continuous data writing and reading of the first data.

The second memory means is a random access memory for random writing/readout of the second data.

The second memory means is a serial access memory for continuous writing/readout of the second data.

The second storage means comprise a random access memory for random writing/readout of second data and a serial access memory for continuous writing/readout of the second data.

With the parallel arithmetic-logical processing device according to the present invention, the first data and the second data, as divided by control means, are supplied to the processing units. The first data from the control means are supplied to first memory means, while the second data from the control means are supplied to second memory means. The first data and the second data as read from the first and second memory means are processed by processing means, the processing data from which are supplied to the control means.

With the parallel arithmetic-logical processing device according to the present invention, the data having a large data volume, such as matrix data, is taken charge of as the first data by the first memory means, comprising a serial access memory for continuous data writing and reading, while the data having a small data volume, such as vector data, is taken charge of as the second data by the second memory means comprising a random access memory for random data writing and readout or a serial access memory for continuous data writing and readout.

Although it is only possible for the serial access memory to have continuous data access, it is capable of high-speed data writing and data readout. Besides, since the address decoder for generating addresses for random data writing or readout may be simplified or eliminated, the serial access memory having a large storage capacity may be fabricated inexpensively.

In scientific and technological calculations, data in need of random access, such as vector data, are only few, while there occur a lot of data in need only of continuous data access, such as matrix data. Consequently, by employing an inexpensive random access memory having a Smaller memory capacity as the second memory means and by employing a serial access memory having a larger memory capacity as the first memory means, production costs of the parallel processing device may be lowered, while data having a larger data volume may be processed speedily.

With the parallel arithmetic-logical processing device of the present invention, the serial access memory having a larger storage capacity and a random access memory having a smaller storage capacity are provided as the first storage means and as the second storage means, respectively, as described above. Writing and readout of data having a large volume, such as matrix data, is performed using the serial access memory, while writing and readout of data having a smaller volume, such as vector data, is performed using the random access memory. The serial access memory is able to perform only continuous data access, and for this very reason, it is capable of high-speed data writing and readout, so that it becomes possible to prevent delay in data processing caused by memory access and hence to speed up the calculation of data having a large data volume.

On the other hand, since the parallel arithmetic-logical operations are not designed for accommodating any particular algorithm, it can accommodate a variety of algorithms consisting mainly in continuous data accessing.

Besides, by providing a serial access memory having a smaller memory capacity in addition to the serial access memory having the larger memory capacity, calculations in need of continuous access, such as calculations involving only matrix data or those involving only vector data, may be executed speedily.

Since the random access memory is also provided, an algorithm in need of non-continuous memory access may also be accommodated.

Since the serial access memory is adapted for being accessed continuously, address decoders for generating addresses pertaining to random writing and readout may be simplified or eliminated so that the memory having a larger memory capacity and hence the parallel processing device may be fabricated at lower costs.

DETAILED DESCRIPTION OF THE PREFERRED EMBODIMENT

Figure 1:
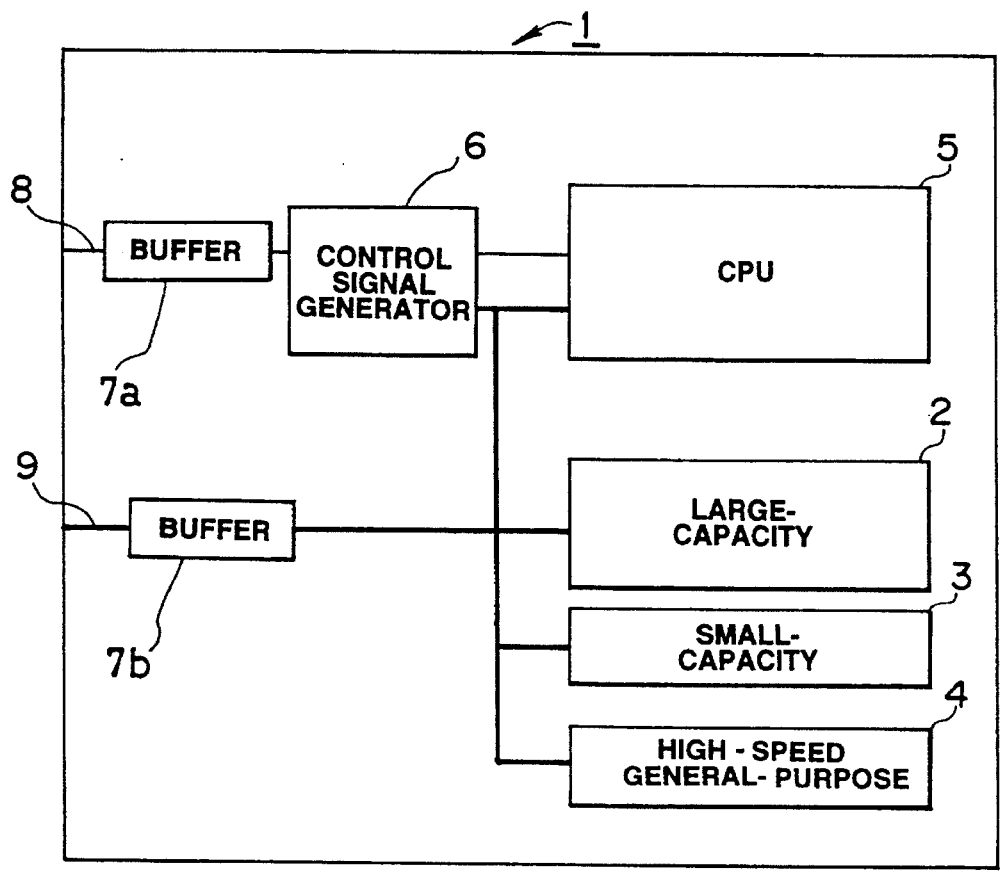
FIG. 1 is a block diagram of processing elements provided in the parallel arithmetic-logical processing device embodying the present invention.
Figure 2:
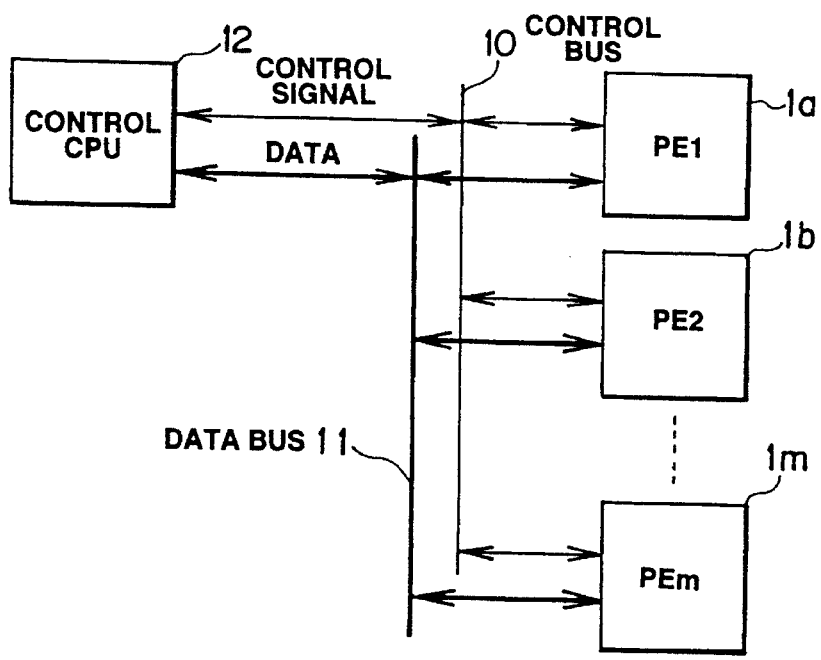
FIG. 2 is a block diagram showing the constitution of the parallel processing device shown in FIG. 1.

Referring to the drawings, a preferred embodiment of the parallel arithmetic-logical processing device according to the present invention is explained.

The parallel processing device according to the present invention comprises a plurality of processing elements $1a$ to $1m$, one of which is shown by a reference numeral 1 shown in FIG. 1. These processing elements $1a$ to $1m$ are connected over a control bus 10 and a data bus 11 acting as control means for outputting control signals and taking charge of data transfer. The number of the processing elements 1 is determined by the scale of the processing operations.

Referring to FIG. 1, each processing element 1 comprises a large capacity continuous input/output I/O memory 2, as first memory means for continuously writing and reading data, a small capacity continuous input/output I/O memory 3, as second memory means for continuously Writing and reading data, and a small capacity high-speed general-purpose random access memory RAM 4, provided as second memory means for random data writing and readout. The memories 2 and 3 are referred to as a large capacity serial access memory SAM and a small capacity serial access memory SAM, respectively.

The high speed general-purpose RAM 4 permits high-speed random data accessing.

Each processing element 1 also comprises a central processing unit CPU 5, as arithmetic-logical processing means for data writing/data reading and a variety of the arithmetic processing operations, a control signal generator 6 as a communication signal generating section for outputting various signals employed during Communication with the outside, and a pair of buffers $7a$ and $7b$ as communication means.

The large-capacity SAM 2, small-capacity RAM 3 and the high-speed general-purpose RAM 4 are connected to the CPU 5, control signal generator 6 and to the buffer $7b$, and the control signal generator 6 is connected to the CPU 5 and the buffer $7a$, while the buffer $7a$ is connected to a control bus 8 and the buffer $7b$ is connected to a data bus 9.

Figure 3:
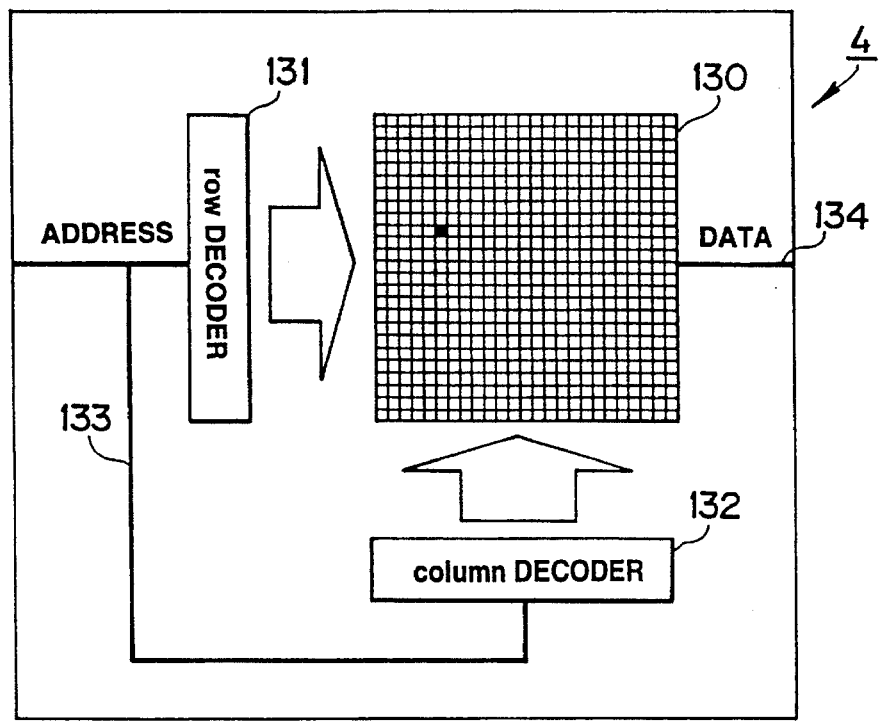
FIG. 3 is a block diagram showing a random access memory provided in the parallel arithmetic-logical processing device shown in FIG. 1.

The high-speed general-purpose RAM 4 is made up of a memory cell array 130 for data writing and reading, a row decoder 131 for generating data writing/reading addresses for rows of the memory cell array 130 and a column decoder 132 for generating data writing/reading addresses for columns of the memory cell array 130, as shown in FIG. 3.

The high-speed general-purpose RAM 4 is used for writing and reading data that is not voluminous but that has to be accessed in a random manner, such as vector data, and for storing program data for operating the CPU 5.

When writing data in the high-speed general-purpose RAM 4, write address data are supplied from the CPU 5 over an address line 133 to the row decoder 131 and to the column decoder 132. The row decoder 131 generates write addresses for the rows of the memory cell array 130, based on the write address data, and routes the produced write address data to the memory cell array 130, while the column decoder 132 generates write addresses for the columns of the memory cell array 130, based on the write address data, and routes the produced write address data to the memory cell array 130. In this manner, the data written over a data line 134 is written in the memory cell array 130.

When reading out the data written in the high-speed general-purpose RAM 4, read address data read out from the CPU 8 over the address line 133 is supplied to the row decoder 131 and the column decoder 132. The row decoder 131 generates readout addresses for the rows of the memory cell array 130 based on the readout address data to route the generated readout address data to the memory cell array 130, while the column decoder 132 generates readout addresses for the columns of the memory cell array 130 based on the readout address data to route the generated readout address data to the memory cell array 130. In this manner, data written in the memory cell array 130 is read out and outputted over the data line 134.

Figure 4:
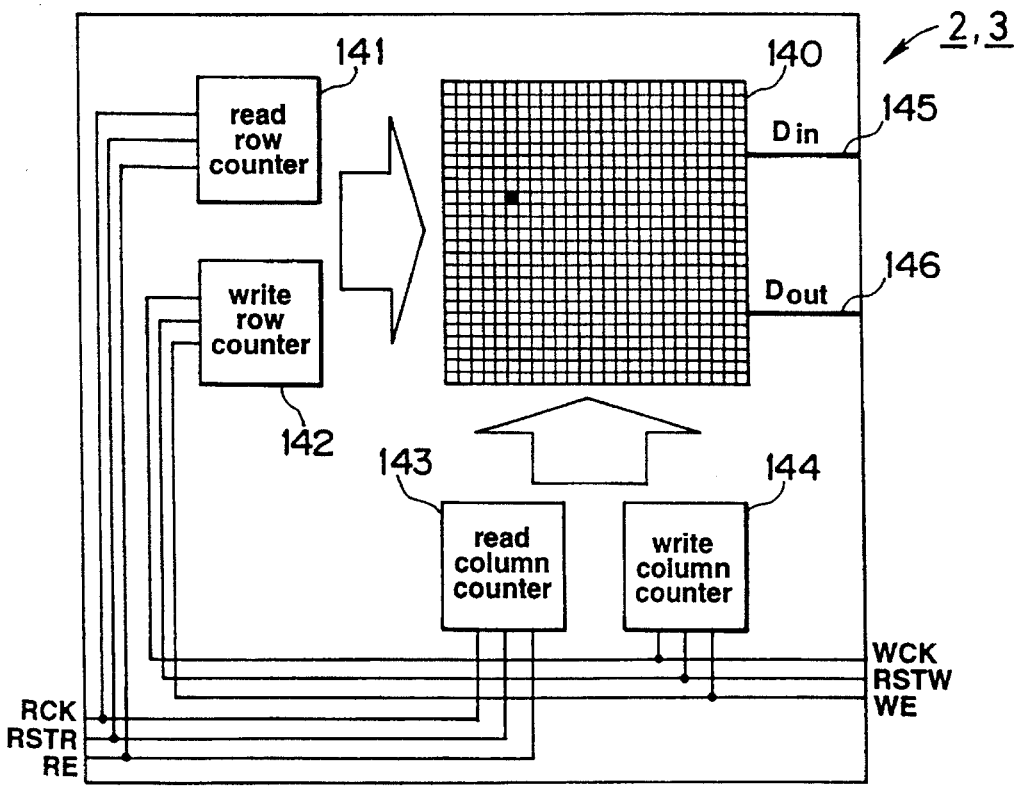
FIG. 4 is a block diagram showing a serial access memory provided in the parallel arithmetic-logical processing device shown in FIG. 1.

Each of the large-capacity SAM 2 and the small-capacity SAM 3 is made up of a memory cell array 140 for data writing and reading, a readout row address counter 141 for generating the data readout addresses for row data of the memory cell array 140, a write row address counter 142 for generating write addresses for the rows of the memory cell array 140, a readout column address counter 143 for generating the data readout addresses for column data of the memory cell array 140 and a write column address counter 144 for generating write addresses for the columns of the memory cell array 140, as shown in FIG. 4.

The large-capacity SAM 2 is provided for writing and reading voluminous data, such as large-scale matrix data, while the small-capacity SAM 3 is provided for writing and reading a small quantity of data, such as small-scale matrix data or vector data for which random accessing is not required.

Figure 5:
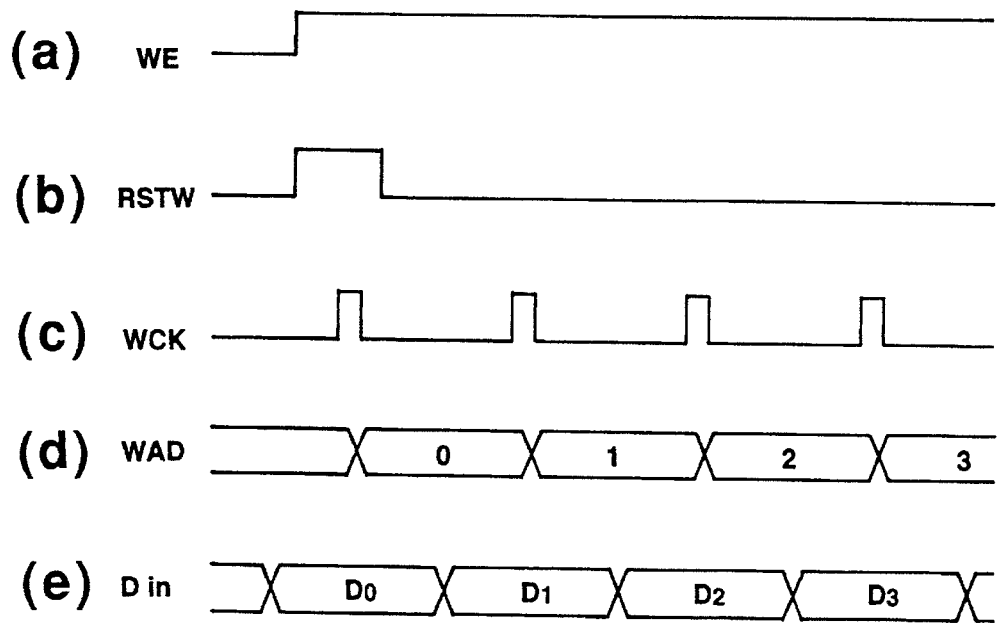
FIG. 5 is a timing chart for illustrating the operation of writing data into the serial access memory.

When writing data in the large-capacity SAM 2 and the small-capacity SAM 3, a reset write signal RSTW, which goes to a high level during a pre-set period as shown at (b) in FIG. 5, and a write enable signal WE, which goes to a high level during the writing period as shown at (a) in FIG. 5, are supplied to the write row address counter 142 and to the write column address counter 144.

The write row address counter 142 and the write column address counter 144 have their count values reset by the reset write signals RSTW to count subsequently supplied write clocks WCK as shown at (c) in FIG. 5 to route count values (0, 1, 2, 3, . . . ) as shown at (d) in FIG. 5 as write row addresses and write column addresses to the memory cell array 140.

Write addresses WAD for the memory cell array 140 are calculated by the following equation (1):

write address=write row address×$n$+write column address  (1)

using the write row addresses and write column addresses, with the size of the memory cell array 140 being n×n.

The memory cell array 140 is supplied with input data $D_{in}$, shown at (e) in FIG. 5, over a data input line 145, which data is written in a write address calculated by the equation (1).

The count values of the write row address counter 142 and the write column address counter 144 are maintained as long as the reset pulses are not supplied thereto. Consequently, by setting the write enable signal WE to the low level when terminating the writing, and by supplying the high-level write enable signal WE for next writing without supplying the reset write signal RSTW, the write row address counter 142 and the write column address counter 144 start counting as from the count value held thus far so that the input data $D_{in}$ may be written in continuation to the address prevailing at the end of writing.

Figure 8:
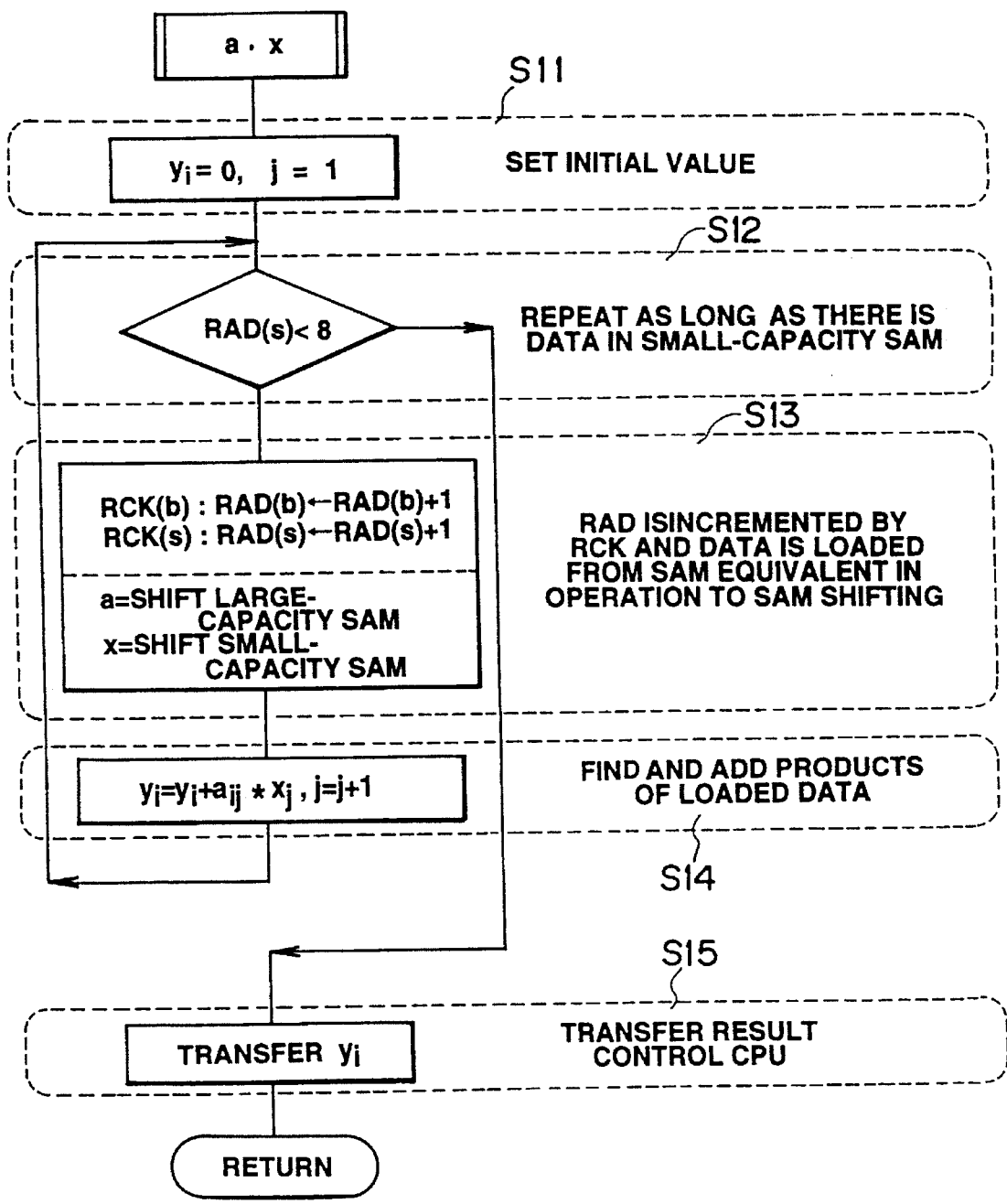
FIG. 8 is a flow chart for illustrating the processing operations for inner products in the parallel arithmetic-logical processing device shown in FIG. 1.

When reading out data written in the memory cell array 140, a reset read signal RSTR, which goes to a high level during a pre-set period as shown at (b) in FIG. 8, and a read enable signal RE, which goes to a high level during the readout period as shown at (a) in FIG. 8, are routed to the readout row address counter 141 and the readout column address counter 143, respectively.

The readout row address counter 141 and the readout column address counter 143 have their count values reset by the reset read signals RSTR to count subsequently supplied read clocks RCK as shown at (c) in FIG. 8 to route count values (0, 1, 2, 3, . . . ) as shown at (d) in FIG. 8 as readout row addresses and readout column addresses to the memory cell array 140.

Readout addresses RAD for the memory cell array 140 are calculated by the following equation (2):

$$\text{readout address} = \text{readout row address} \times n + \text{readout column address} \quad (2)$$

using the readout row addresses and readout column addresses, with the size of the memory cell array 140 being n×n.

Figure 6:
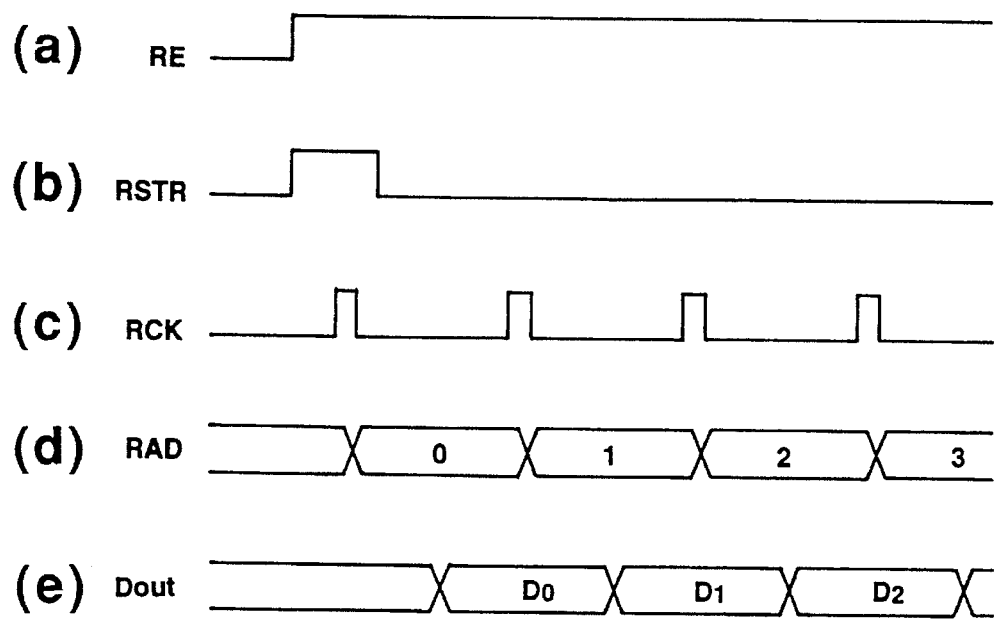
FIG. 6 is a timing chart for illustrating the operation of reading data from the serial access memory.

The input data $D_{in}$, written in the memory cell array 140, is read on the basis of the readout addresses calculated by the equation (2) so as to be outputted over a data output line 146 as output data $D_{out}$ as shown at (e) in FIG. 6.

The count values of the readout row address counter 141 and the readout column address counter 143 are maintained as long as the reset read signals RSTR are not supplied thereto. Consequently, by setting the readout enable signal RE to the low level when terminating the reading, and by supplying the high-level read enable signal RE without supplying the reset read signal RSTR for reading, the readout row address counter 141 and the readout column address counter 143 start counting as from the count value held thus far so that data reading may be made in continuation to the address prevailing at the end of reading.

Figure 7:
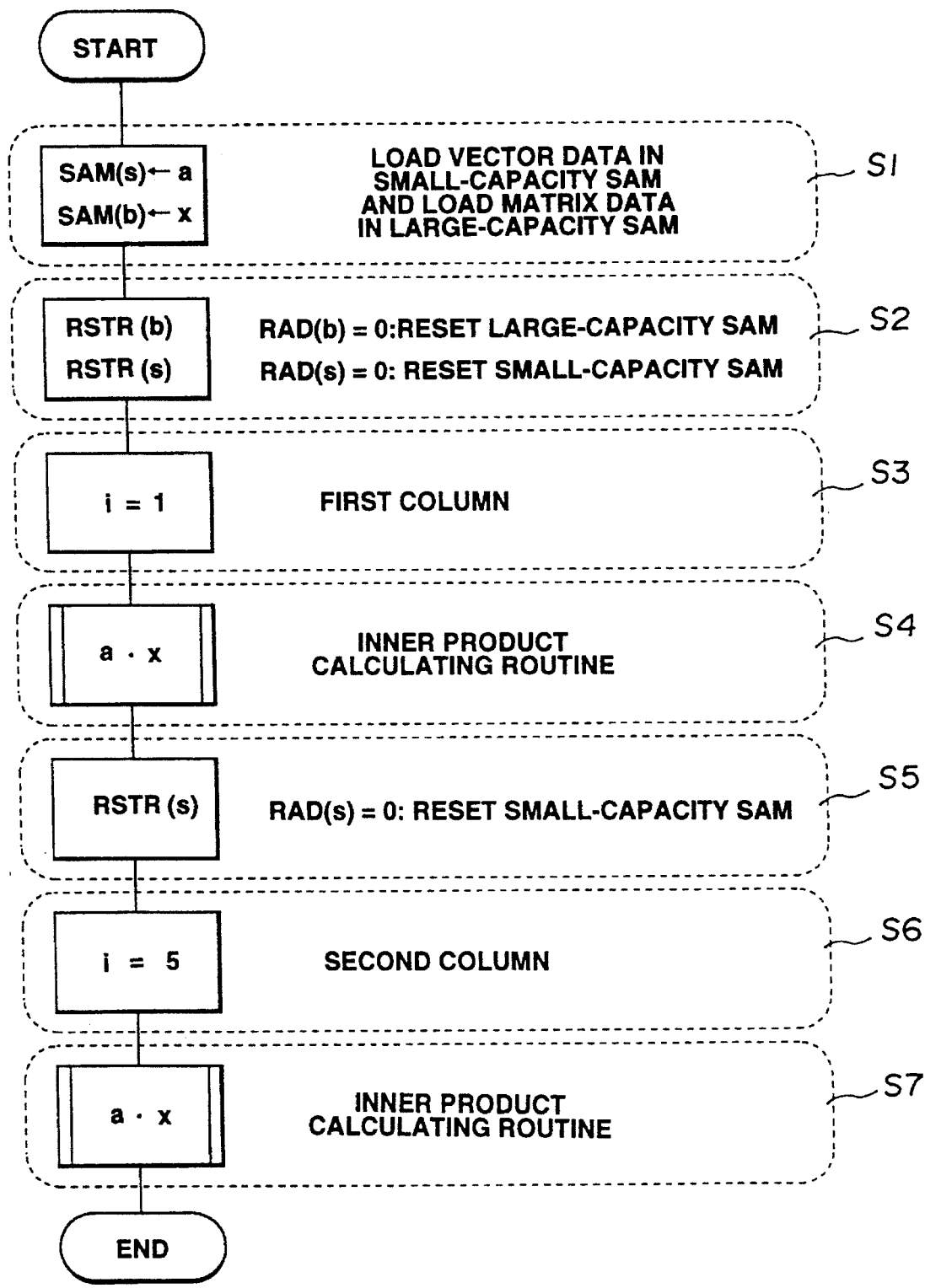
FIG. 7 is a flow chart for illustrating the processing operation of one of processing elements in the parallel arithmetic-logical processing device shown in FIG. 1.

The arithmetic-logical processing operations to be executed by the above-described parallel processing device for multiplying matrix data and vector data shown by the equation (3):

$$\begin{pmatrix} y_1 \\ y_2 \\ \cdot \\ \cdot \\ \cdot \\ y_8 \end{pmatrix} = \begin{pmatrix} a_{11} & a_{12} & \ldots & a_{18} \\ a_{21} & a_{22} & \ldots & a_{26} \\ \cdot & \cdot & & \cdot \\ \cdot & \cdot & & \cdot \\ \cdot & \cdot & & \cdot \\ a_{81} & a_{82} & \ldots & a_{88} \end{pmatrix} \begin{pmatrix} x_1 \\ x_2 \\ \cdot \\ \cdot \\ \cdot \\ x_8 \end{pmatrix} \quad (3)$$

are explained by referring to the flow charts shown in FIGS. 7 and 8.

Since the matrix has a size of 8×8 (n=8), the processing operations may be represented by the eight inner products of the eight row vectors $a_1, a_2, \ldots a_8$ by the vector x in accordance with the following equation (4):

$$\begin{aligned} y_1 &= a_1 \cdot x \\ y_2 &= a_2 \cdot x \\ &\cdot \\ &\cdot \\ &\cdot \\ y_8 &= a_8 \cdot x \end{aligned} \quad (4)$$

Figure 9:
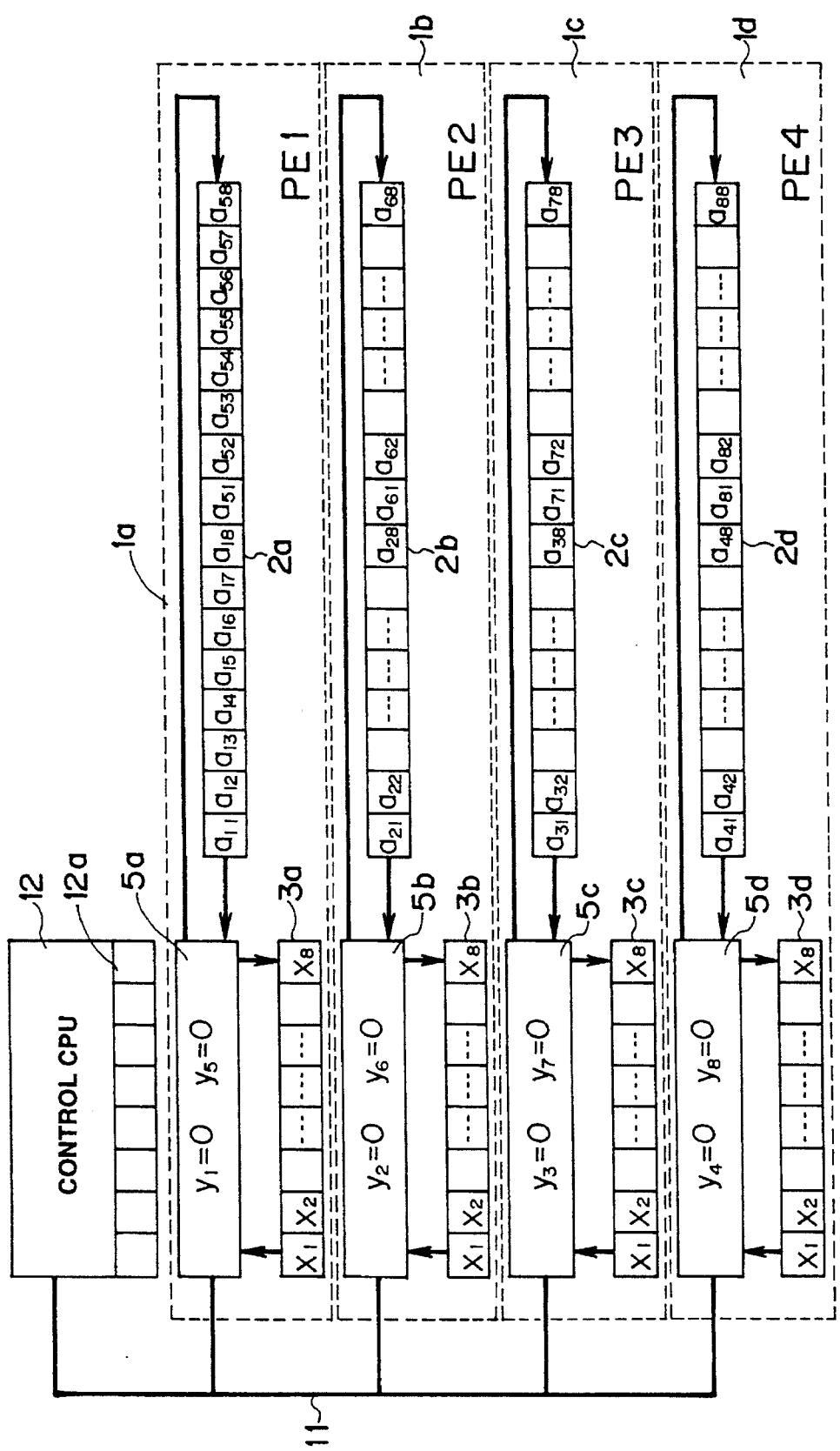
FIG. 9 is shows matrix data and vector data written in a large capacity SAM and a small capacity SAM, respectively, of each processing element provided in the parallel arithmetic-logical processing device shown in FIG. 1.

In such case, the parallel processing device executes the processing operations for finding the inner products using the large capacity SAMs 2a to 2d and the small-capacity SAMs 3a to 3d provided in each of the four processing elements 1a to 1d, as shown in FIG. 9.

That is, each processing element executes two inner product operations for execution in parallel of the eight inner product operations by the four processing elements 1a to 1d.

The inner product operations may be executed independently, such that it does not matter which of the processing elements executes the operations for which one of the rows. Thus the first CPU 5a of the first processing element 1a calculates inner product data $y_1$ and $y_5$, while the second CPU 5b of the second processing element 1b calculates inner product data $y_2$ and $y_6$ shown by the equation (4). Similarly, the third CPU 5c of the third processing element 1c calculates inner product data $y_3$ and $y_7$, while the fourth CPU 5d of the fourth processing element 1d calculates inner product data $y_4$ and $y_8$ shown by the equation (4).

In FIGS. 9 to 13, referred to in the following description, the high-speed general-purpose RAM 4, which is not employed in the present arithmetic-logical operations, is not shown. Since FIGS. 9 to 13 show the movement of data pertinent to the arithmetic-logical operations, the control signal generator 6 also is not shown.

In FIG. 7, when starting the arithmetic-logical operations, the flow chart is started, and the parallel processing device proceeds to a step S1. At the step S1, the write enable signal WE and the read enable signal RE are supplied from the CPUs 5a to 5d of the processing elements 1a to 1d to the large-capacity SAMs 2a to 2d and the small-capacity SAMs 3a to 3d. On the other hand, the reset write signals RSTW and the reset read signals RSTR are supplied to reset the readout row address counter 141, readout column address counter 143, write row address counter 142 and to the write column address counter 144.

At the step S1, the CPUs 5a to 5d supply the write clocks WCK to the write row address counter 142 and to the write column address counter 144, while supplying the vector data $x_1$ to $x_8$ to each memory cell array 140. This causes the vector data $x_1$ to $x_8$ to be written at write addresses WAD(s) in each of the memory cell array 140 of the small capacity SAMs 3a to 3d of the processing elements 1a to 1d as indicated by the count values of write row address counter 142 and the write column address counter 144.

At the step S1, each of the CPUs 5a to 5d supplies the write clocks WCK to the write row address counter 142 and to the write column address counter 144 of the large capacity SAMs 2a to 2d. Simultaneously, each of the CPUs 5a to 5d transmits matrix data $a_{11}$ to $a_{18}$ and $a_{51}$ to $a_{58}$ pertaining to $y_1$ to $y_5$ of the matrix data to the memory cell array 140 of the large capacity SAM 2a of the first processing element 1a, while transmitting matrix data $a_{21}$ to $a_{28}$ and $a_{61}$ to $a_{68}$ pertaining to $y_2$ to $y_6$ of the matrix data to the memory cell array 140 of the large capacity SAM 2b of the second processing element 1b. Each of the CPUs 5a to 5d also transmits matrix data $a_{31}$ to $a_{38}$ and $a_{71}$ to $a_{78}$ pertaining to $y_3$ to $y_7$ of the matrix data to the memory cell array 140 of the large capacity SAM 2c of the third processing element 1c, while transmitting matrix data $a_{41}$ to $a_{48}$ and $a_{81}$ to $a_{88}$ pertaining to $y_4$ to $y_8$ of the matrix data to the memory cell array 140 of the large capacity SAM 2d of the fourth processing element 1d.

This causes the matrix data $a_{11}$ to $a_{18}$ and $a_{51}$ to $a_{58}$; $a_{21}$ to $a_{28}$ and $a_{61}$ to $a_{68}$; $a_{31}$ to $a_{38}$ and $a_{71}$ to $a_{78}$; and $a_{41}$ to $a_{48}$ and $a_{81}$ to $a_{88}$ be written in the memory cell array 140 of the large capacity SAM 2a of the first processing element 1a, memory cell array 140 of the large capacity SAM 2b of the second processing element 1b, memory cell array 140 of the large capacity SAM 2c of the third processing element 1c and in the memory cell array 140 of the large capacity SAM 2d of the fourth processing element 1d, respectively, as shown in FIG. 9.

At the step S1, the control CPU 12 initializes a storage area 12a to zero. The storage area 12a is an area in which to store the inner product processing data $y_1$, $y_5$; $y_2$, $y_6$; $y_3$, $y_7$; and $y_4$, $y_8$.

If the data $x_1$ to $x_8$ and $a_{11}$ to $a_{88}$ have been written at the step S1, and the storage area 12a of the control CPU 12 has been initialized, the parallel processing device proceeds to a step S2.

At the step S2, the reset read signal RSTR(b) for the large capacity SAM and the reset read signal RSTR(s) for the small capacity SAM are supplied to reset the readout row address counter 141 and the readout column address counter 143.

At the next step S3, it is declared the first one of rows taken charge of by the processing element 1a is now processed.

Figure 10:
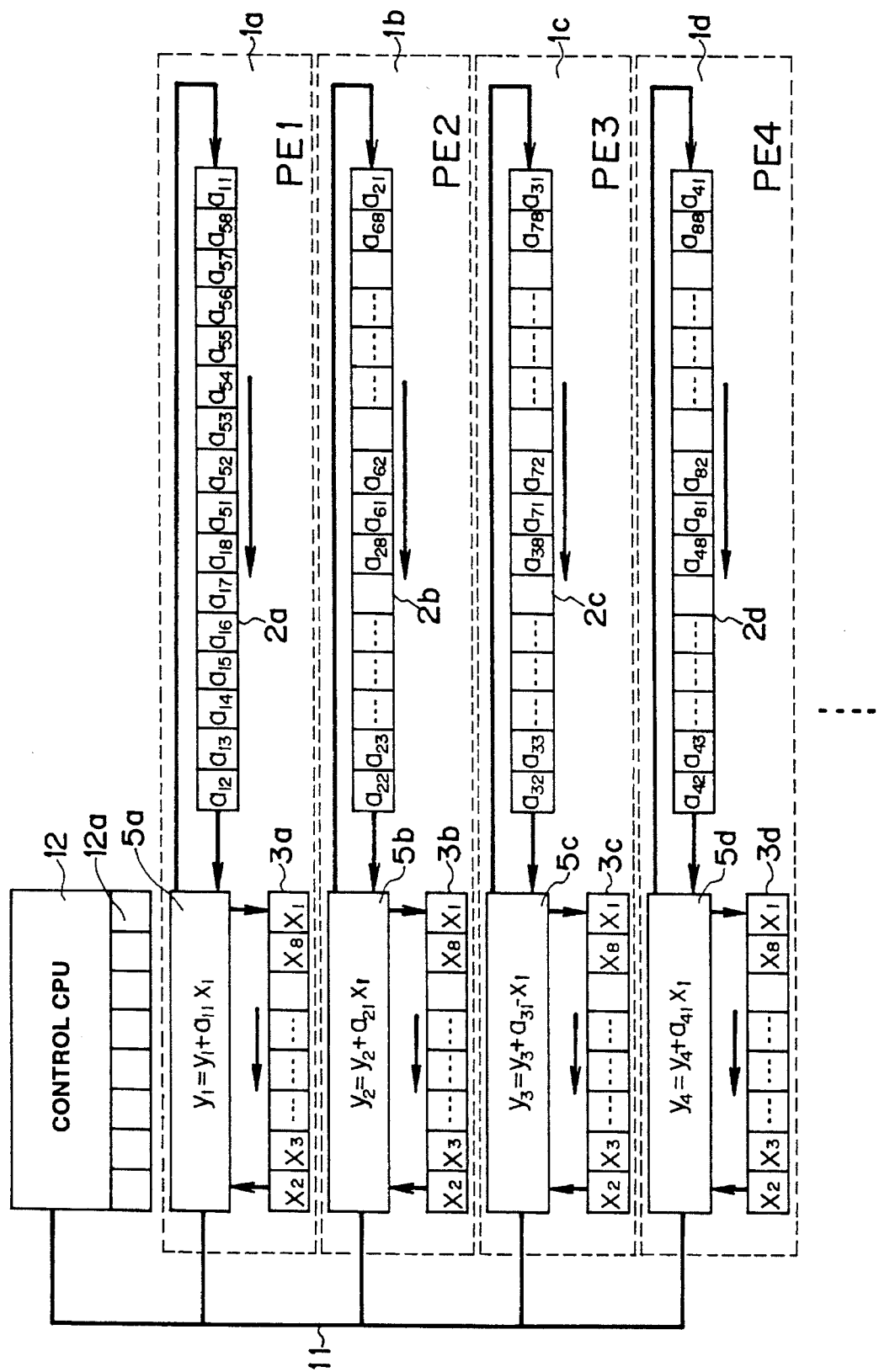
FIG. 10 shows the arithmetic-logical operations for inner products performed by each processing element provided in the parallel arithmetic-logical processing device shown in FIG. 1.

At a step S4, each of the CPUs 5a to 5d shifts the matrix data written in the large capacity SAMs 2a to 2d and the vector data written in the small capacity SAMs 3a to 3d by one to fetch the shifted matrix data and vector data, as shown in FIG. 10.

That is, at the step S4, each of the CPUs 5a to 5d sequentially fetches the vector data $x_1$ to $x_8$ written in the small capacity SAMs 3a to 3d. On the other hand, the first CPUs 5a to 5d sequentially fetch the matrix data $a_{11}$ to $a_{18}$, $a_{21}$ to $a_{28}$, $a_{31}$ to $a_{38}$ and $a_{41}$ to $a_{48}$, respectively.

Next, at the step S4, each of the CPUs 5a to 5d calculates the products of the vector data and matrix data, fetched one by one, and adds the products to $y_1$, $y_2$, $y_3$ and $y_4$, by way of executing an inner product calculating routine, for generating inner product processing data $y_1=y_1+a_{11}x_1$, $y_2=y_2+a_{21}x_1$, $y_3=y_3+a_{31}x_1$ and $y_4=y_4+a_{41}x_1$, and transiently storing the generated data.

At the step S4, each of the CPUs 5a to 5d executes the above inner product calculating routine repeatedly until the processing operations of $y_1=y_1+a_{18}x_1$, $y_2=y_2+a_{28}x_8$, $y_3=y_3+a_{38}x_8$ and $y_4=y_4+a_{48}x_8$, comes to an end. When the processing operations of $y_1=y_1+a_{18}x_1$, $y_2=y_2+a_{28}x_8$, $y_3=y_3+a_{38}x_8$ and $y_4=y_4+a_{48}x_8$ comes to an end, each CPU routes the inner product data $y_1$ to $y_4$ temporarily stored therein to the control CPU 12 over a data bus 11. The parallel processing device then proceeds to a step S5.

In this manner, the inner product data $y_1$ to $y_4$ are stored in the storage area 12a provided in the control CPU 12.

At the step S5, each of the CPUs 5a to 5d transmits the reset read signal RSTR(s) to each readout row address counter 141 and the readout column address counter 143 of the small capacity SAMs 3a to 3d to reset the readout row address counter 141 and the readout column address counter 143 to reset the readout address RAD(s) to zero. The parallel processing device then proceeds to a step S6.

In this manner, the vector data are again read from each of the small-capacity SAMs 3a to 3d during the next data readout beginning from the first vector data $x_1$.

At the step S6, it is declared that the second of the rows taken charge of by the processing element 1a is now processed at the next step S37. It is noted that the processing element 1a takes charge of the first and fifth rows of the matrix.

Figure 11:
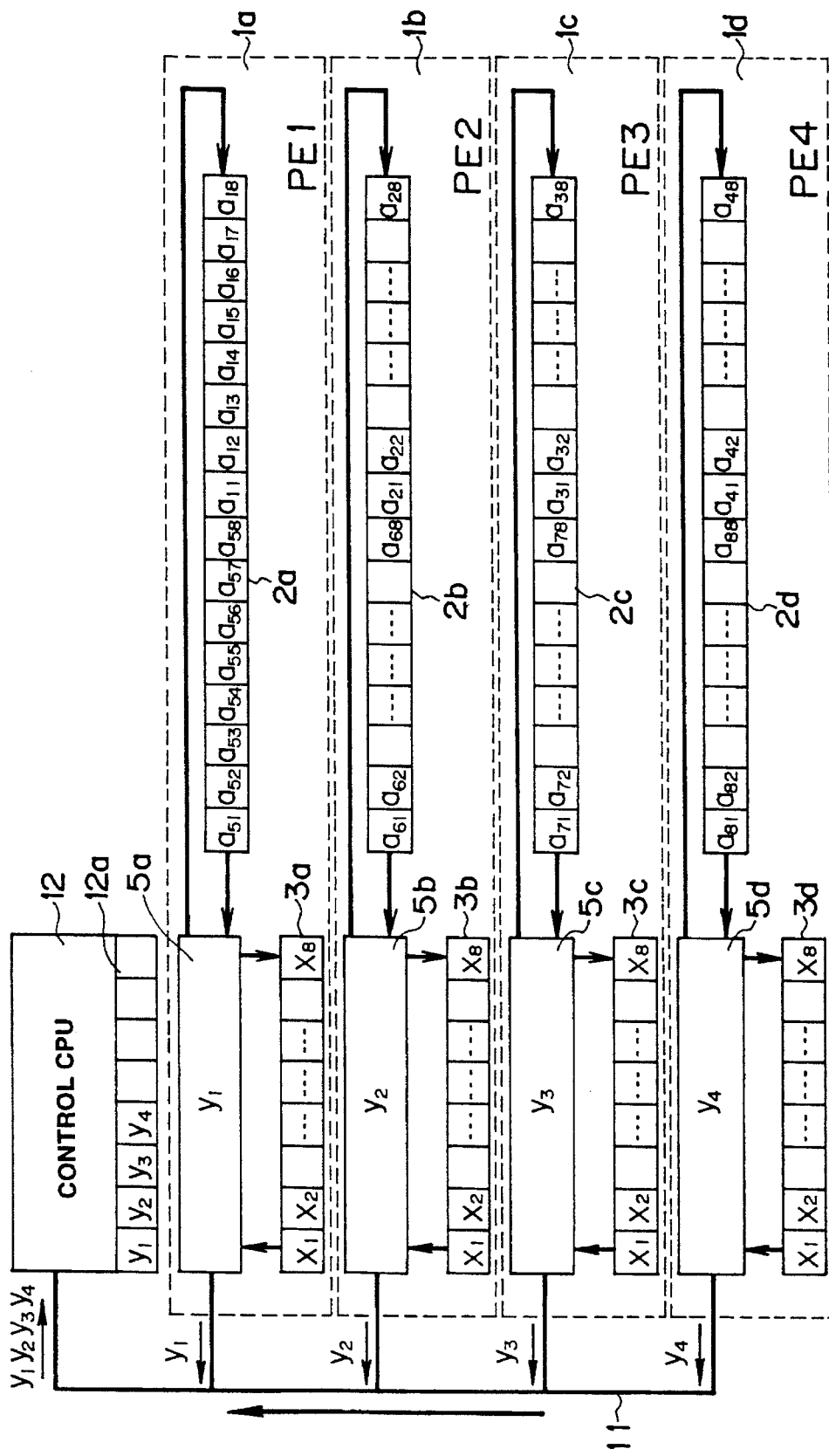
FIG. 11 illustrates the manner in which the inner product processing data concerning the first rows of the matrix data is transferred to a control CPU from the CPU of each processing element provided in the parallel arithmetic-logical processing device shown in FIG. 1.

At the step S7, each of the CPUs 5a to 5d sequentially fetches the vector data $x_1$ to $x_8$ from the small capacity SAMs 3a to 3d, as shown in FIG. 11. Besides, the first to fourth CPUs 5a to 5d sequentially fetch the matrix data $a_{51}$ to $a_{58}$, $a_{61}$ to $a_{68}$, $a_{71}$ to $a_{78}$ and $a_{81}$ to $a_{88}$, as shown in FIG. 11.

At the step S7, each of the CPUs 5a to 5d calculates the products of the vector and matrix data, fetched one by one and adds the products to $y_5$, $y_6$, $y_7$ $y_8$, by way of executing an inner product calculating routine, for generating inner product processing data $y_5=y_5+a_{51}x_1$, $y_6=y_6+a_{61}x_1$, $y_{71}=y_7+a_{71}x_1$ and $y_8=y_8+a_{81}x_1$, and transiently storing the generated data.

Meanwhile, the above-described inner product calculating routine at the step S7 is executed repeatedly until each of the CPUs 5a to 5d completes the processing operations of $y_5=y_5+a_{58}x_8$, $y_6=y_6+a_{68}x_8$, $y_7=y_7+a_{78}x_8$ and $y_8=y_8+a_{88}x_8$.

Figure 12:
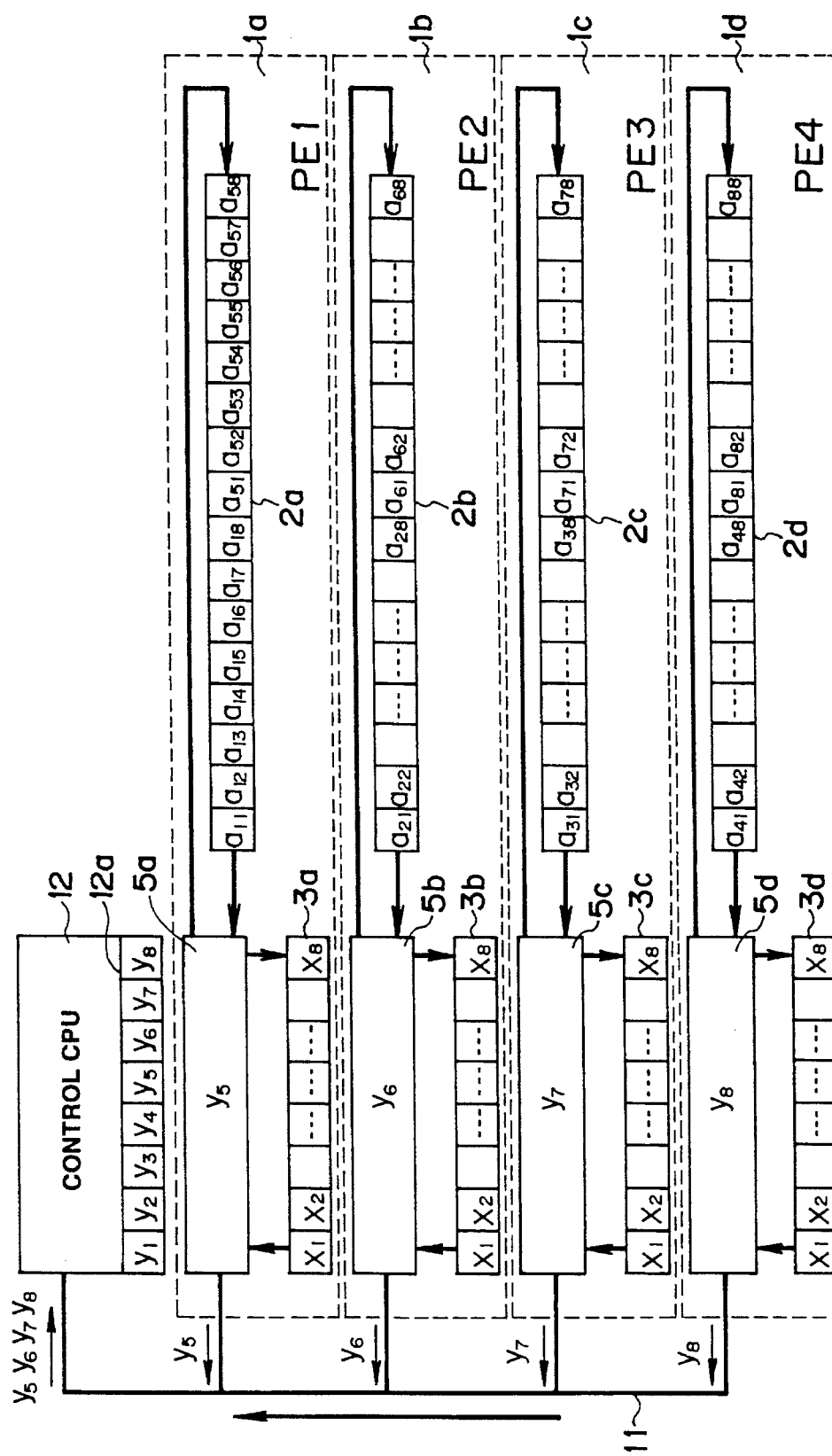
FIG. 12 illustrates the manner in which the inner product processing data concerning the second rows of the matrix data is transferred to a control CPU from the CPU of each processing element provided in the parallel arithmetic-logical processing device shown in FIG. 1.

When each of the CPUs 5a to 5d completes the inner product calculating routine, it transmits the temporally stored inner product processing data $y_5$ to $y_8$ to the control CPU 12 over the data bus 11, as shown in FIG. 12, to complete the routine of executing the flow chart shown in FIG. 7.

This causes the inner product processing data of $y_1$ to $y_4$ and $y_5$ to $y_8$ to be stored in the storage area 12a provided in the control CPU 12, as shown in FIG. 12.

Meanwhile, the inner product processing data, such as data $y_1$ to $y_8$ stored in the storage area 12a of the control CPU 12, are routed to a monitoring device, not shown, for display therein, or supplied to a printer, not shown, for printing, so as to be used for researches or investigations.

The detailed operations of the CPUs 5a to 5d pertaining to the inner product calculations as described with the aid of the flow chart of FIG. 7, are shown in FIG. 8.

That is, when the writing of the matrix data $a_{11}$ to $a_{88}$ and the vector data $x_1$ to $x_8$ in the large-capacity SAMs 2a to 2d and the small-capacity SAMs 3a to 3d is completed, each of the CPUs 5a to 5d proceeds to a step S11 shown in FIG. 8. At the step S11, the results of the arithmetic-logical operations are set to zero ($Y_j=0$) and the number of the arithmetic-logical operations j is set to 1 (j=1), before the parallel processing device proceeds to a step S12.

As explained with reference to FIG. 4, data is written in the large-capacity SAMs 2a to 2d and the small-capacity SAMs 3a to 3d in the address sequence, while data writing is made on the clock basis by the write clocks WCK shown at (c) in FIG. 5. Consequently, data writing may be achieved with a delay less than a clock cycle, so that data writing may be completed extremely speedily.

At the step S12, each of the CPUs 5a to 5d detects the number of times of the arithmetic-logical operations j and discriminates whether or not the number j is lesser than 8, that is whether or not the inner product calculation up to the eighth row of the matrix data has come to a close. If the result of discrimination is NO, the parallel processing device proceeds to a step S15. If the result is YES, the device proceeds to a step S13.

At the step S13, the write addresses RAD(b) and RAD(b) are incremented by write clocks RCK(b) and RCK(s) and the matrix and vector data written in the large-capacity SAMs 2a to 2d and the small-capacity SAMs 3a to 3d are fetched one by one as shown in FIG. 10. The parallel processing device then proceeds to a step S14.

As explained with reference to FIG. 4, the data written in the large-capacity SAMs 2a to 2d and the small-capacity SAMs 3a to 3d are read out on the clock basis by the readout clocks shown at (c) in FIG. 6 in the sequence of the addresses as used during writing. Consequently, data reading may be achieved with a delay less than a clock cycle, so that data readout may be completed extremely speedily.

At the step S14, the inner product calculations of $y_1=y_1+a_{11}x_1$, $y_2=y_2+a_{21}x_1$, $y_3=y_3+a_{31}x_1$ and $y_4=y_4+a_{41}x_1$ are executed, based on the matrix data and the vector data fetched at the step S13, as shown in FIG. 10. After the results of the inner product processing data are stored temporarily, the number of times of the processing operations j is incremented by one (j=j+1). The parallel processing device then reverts to the step S12.

The data written in the large-capacity SAMs 2a to 2d and the small-capacity SAMs 3a to 3d are read out speedily and supplied to each of the CPUs 5a to 5d, as described above. Since the processing speed of the CPUs 5a to 5d is higher than conventionally, the inner product calculations may be achieved without delay even although the data is supplied speedily in this manner. Consequently, the processing speed may be raised in an amount corresponding to the increase in the data reading and writing into and from the large-capacity SAMs 2a to 2d and the small-capacity SAMs 3a to 3d.

Each of the CPUs 5a to 5d executes the processing operations of the steps S12 to S14 repeatedly. When the number of the processing operations is detected to be nine at the step S12, the parallel processing device proceeds to a step S15.

Figure 13:
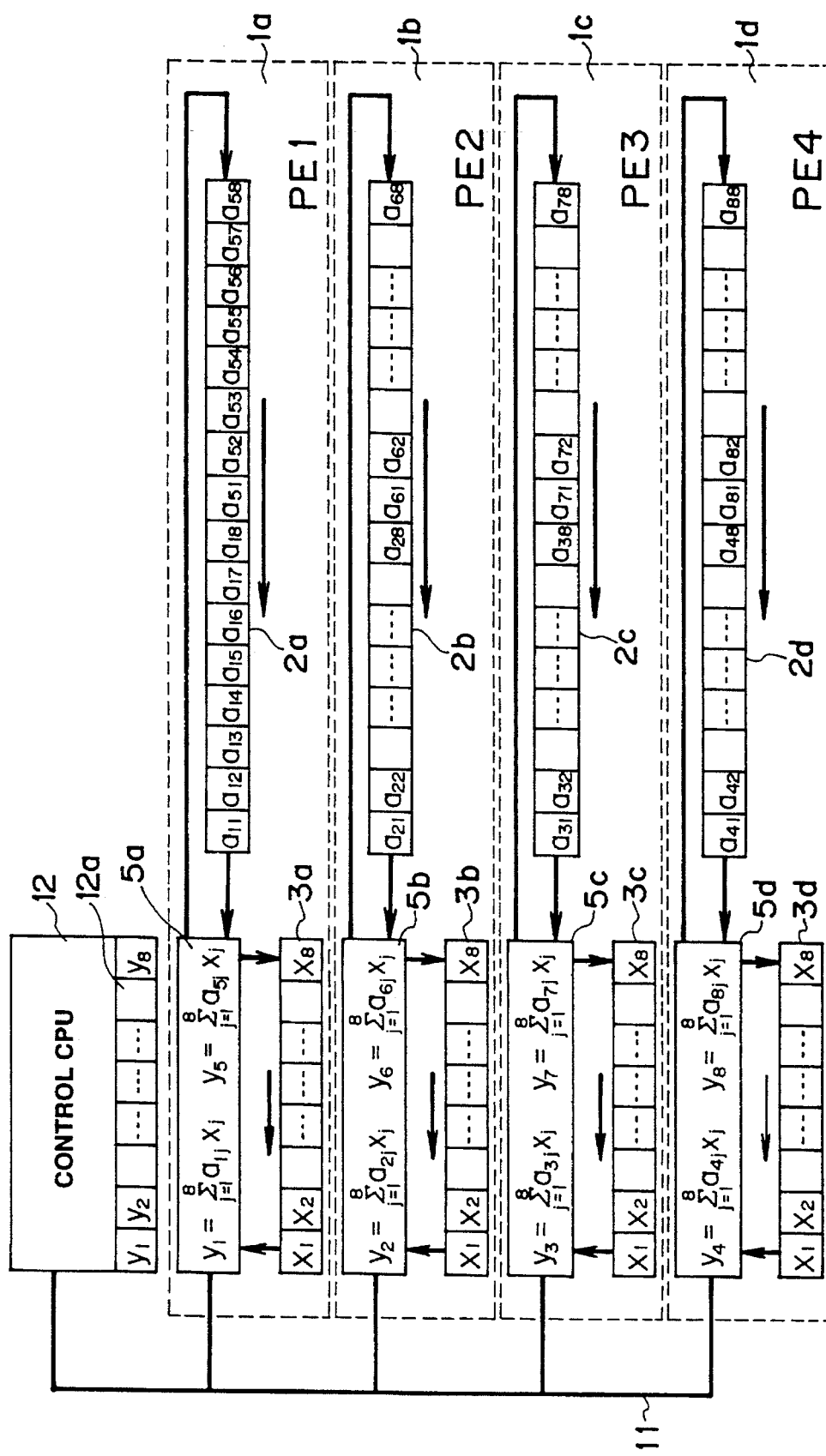
FIG. 13 illustrates the overall processing operation for finding the inner products in each processing element provided in the parallel arithmetic-logical processing device shown in FIG. 1.
Figure 14:
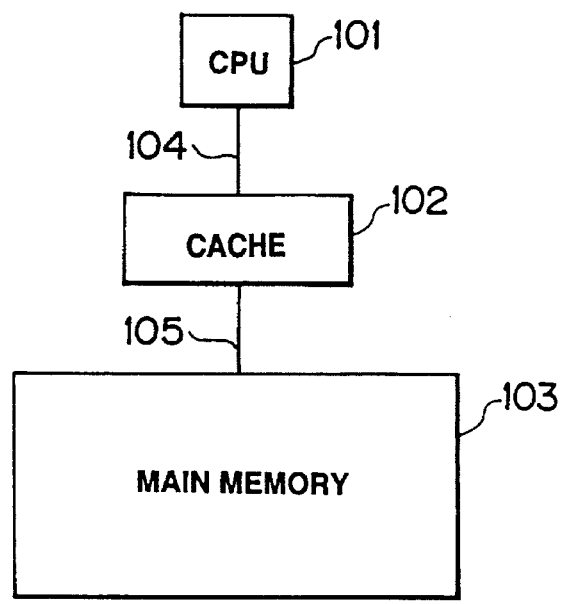
FIG. 14 is a block diagram showing a conventional computer employing a cache memory.
Figure 15:
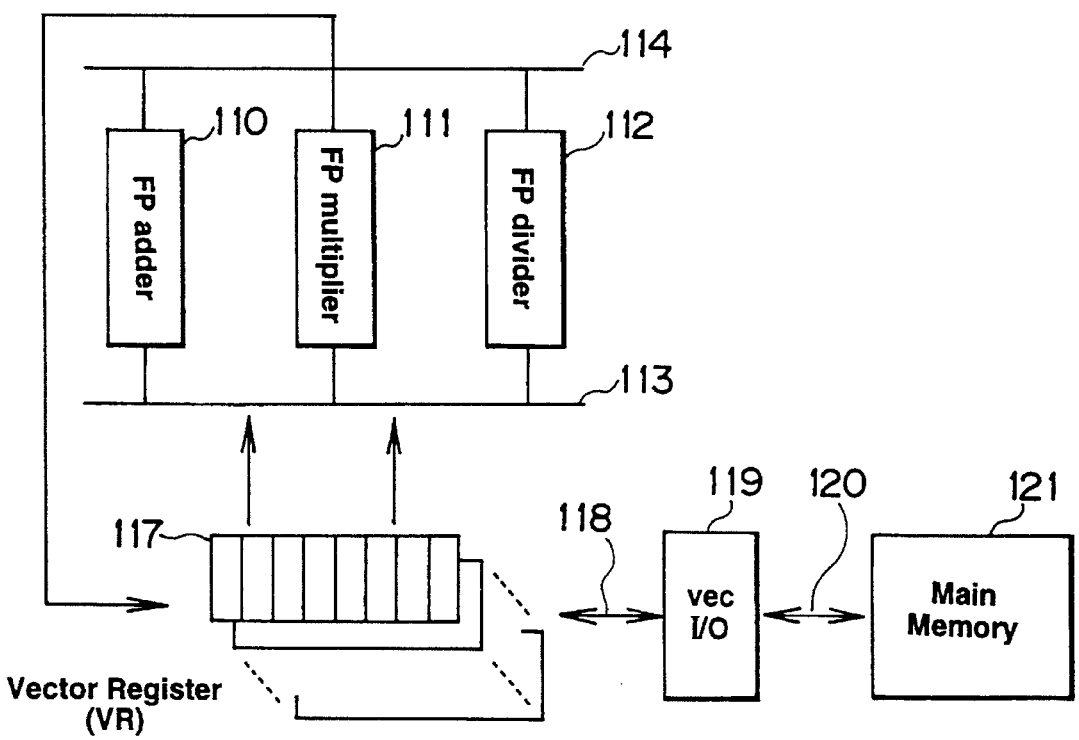
FIG. 15 is a block diagram of a conventional supercomputer employing plural vector registers.

The first to fourth CPUs 5a to 5d then execute the inner product calculations according to the following equations (5) to (8), as shown in FIG. 13, and temporarily store the four inner product processing data $y_1$ to $y_4$:

$$y_1 = \sum_{j=1}^{8} a_{1j} x_j \quad (5)$$

$$y_2 = \sum_{j=1}^{8} a_{2j} x_j \quad (6)$$

$$y_3 = \sum_{j=1}^{8} a_{3j} x_j \quad (7)$$

$$y_4 = \sum_{j=1}^{8} a_{4j} x_j \quad (8)$$

The parallel processing device then proceeds to the step S15.

At the step S15, each of the CPUs 5a to 5d routes the temporarily stored inner product data $y_1$ to $y_4$ to the control CPU as shown in FIG. 12. This causes the four inner product processing data $y_1$ to $y_4$ to be stored in the storage area 12a of the control CPU 12.

Each of the CPUs 5a to 5d executes the processing operations of the steps S11 to S15 repeatedly to find four inner product data $y_5$ to $y_8$ in accordance with the following equations (9) to (12):

$$y_5 = \sum_{j=1}^{8} a_{5j} x_j \quad (9)$$

$$y_6 = \sum_{j=1}^{8} a_{6j} x_j \quad (10)$$

$$y_7 = \sum_{j=1}^{8} a_{7j} x_j \quad (11)$$

$$y_8 = \sum_{j=1}^{8} a_{8j} x_j \quad (12)$$

This causes eight inner product data $y_1$ to $y_8$ to be stored in the storage area 12a of the control CPU 12. Although the high-speed general-purpose RAM 4 is not specifically explained in the foregoing description, it is customarily employed for processing the data in need of random accessing.

In this manner, a large-capacity SAM, having a larger storage capacity, a small-capacity SAM, having a small storage capacity, and a high-speed general-purpose RAM 4, are provided in each processing element, and the writing and readout of data having a large data volume, such as matrix data, is taken charge of by the large capacity SAM, while the writing and readout of data having a small data volume, such as vector data, is taken charge of by the small-capacity SAM or the high-speed general-purpose RAM 4. Although only continuous data accessing may be made with the large-capacity SAM or the small-capacity SAM, high-speed data writing and readout may nevertheless be achieved by these memories to render it possible to prevent delay in data processing by memory accessing as well as to raise the processing speed for data having a larger data volume, such as matrix data.

Besides, since the parallel arithmetic-logical processing device is not designed to accommodate any particular algorithms, it becomes possible to accommodate a variety of algorithms involving continuous data access operations.

Since the small-capacity SAM is provided in addition to the large-capacity SAM, the processing operations in need of continuous accessing operations, such as calculations of matrix data or those of vector data, may be executed speedily.

Since the high-speed general-purpose RAM 4 is also provided, it becomes possible to accommodate an algorithm in need of non-continuous memory access operational.

Since the large-capacity SAM and the small-capacity SAM are designed to execute continuous data access, an address decoder for generating addresses employed for random writing and reading may be simplified or eliminated, such that the SAM having a larger storage capacity may be fabricated inexpensively. The result is that the parallel arithmetic-logical processing device may be fabricated inexpensively.

In the foregoing description, the large-capacity SAM 2, the small-capacity SAM 3 and the high-speed general-purpose RAM 4 are employed a storage means. However, the small-capacity SAM 3 may be eliminated, or alternatively, one or more SAMs may be provided in place of the high-speed general-purpose RAM 4.

The large-capacity SAM 2 and the small-capacity SAM 3 are physically equivalent to the customary RAM except that no address input is provided in the large-capacity SAM 2 and the small-capacity SAM 3. On the other hand, the large-capacity SAM 2 and the small-capacity SAM S are equivalent in operational aspects to the large-capacity shift register or a first-in-first-out (FIFO). For this reason, the shift register or the FIFO may be provided in place of the large-capacity SAM 2 and the small-capacity SAM 3.

In FIGS. 9 to 13, the matrix data and the vector data, read from the large-capacity SAMs 2a to 2d and the small-capacity SAMs 3a to 3d, are shown as being re-written in the large-capacity SAMs 2a to 2d and the small-capacity SAMs 3a to 3d after the end of the processing operations. However, this is merely for facilitating the understanding of the shift operations for the matrix data and the vector data, and the large-capacity SAMs 2a to 2d and the small-capacity SAMs 3a to 3d are actually designed to hold the as-read data, that is the read-out data is not written again.

What is claimed is:

1. A parallel arithmetic-logical processing device in which data to be processed is divided into first data and second data by control means and supplied to a plurality of processing units so as to be parallel-processed by said processing units, said processing units including first storage means for continuous writing and readout of said first data, second storage means for continuous writing and readout of said second data, processing means for executing inner product operations on said first data read out from said first storage means and on said second data read out from said second storage means, communication means for supplying said first data and second data from said control means to said first storage means and second storage means and for supplying processed data from said processing means to said control means, and communication control means for controlling data input/output at said communication means.

2. The parallel arithmetic-logical processing device as claimed in claim 1 wherein said first data is matrix data and said second data is vector data.

3. The parallel arithmetic-logical processing device as claimed in claim 1 wherein said first memory means is a serial access memory for continuous data writing and reading of said first data.

4. The parallel arithmetic-logical processing device as claimed in claim 1 wherein said second memory means is a random access memory for random writing/readout of said second data.

5. The parallel arithmetic-logical processing device as claimed in claim 1 wherein said second memory means is a serial access memory four continuous writing/readout of said second data.

6. A parallel arithmetic-logical processing device in which data to be processed is divided into first data and second data by control means and supplied to a plurality of processing units so as to be parallel-processed by said processing units, said processing units including first storage means for continuous writing and readout of said first data, second storage means for continuous writing and readout of said second data, processing means for executing inner product operations on said first data read out from said first storage means and on said second data read out from said second storage means, communication means for supplying said first data and second data from said control means to said first storage means and second storage means and for supplying processed data from said processing means to said control means, and communication control means for controlling data input/output at said communication means, wherein said second storage means comprise a random access memory for random writing/readout of said second data and a serial access memory for continuous writing/readout of said second data.

7. A processing element comprising:

a central processing unit that computes inner products in a multiplication of a matrix and a vector;

a first serial access memory that stores matrix data having a first data storage capacity coupled to the central processing unit;

a second memory that stores vector data having a second data storage capacity coupled to the central processing unit;

a data input/output port having an internal data terminal and an external data terminal, wherein the internal data terminal is coupled to the first serial access memory and the second memory;

a communication controller having an internal control terminal and an external control terminal, wherein the internal control terminal is coupled to the central processing unit, the first serial access memory, and the second memory;

wherein the first data storage capacity is greater than the second data storage capacity; and a third high-speed random access memory that stores a program for the central processing unit and intermediate and final inner product results.

8. A processing element comprising:

a central processing unit that computes inner products in a multiplication of a matrix and a vector;

a first serial access memory that stores matrix data having a first data storage capacity coupled to the central processing unit;

a second memory that stores vector data having a second data storage capacity coupled to the central processing unit;

a data input/output port having an internal data terminal and an external data terminal, wherein the internal data terminal is coupled to the first serial access memory and the second memory;

a communication controller having an internal control terminal and an external control terminal, wherein the internal control terminal is coupled to the central processing unit, the first serial access memory, and the second memory;

wherein the first data storage capacity is greater than the second data storage capacity;

wherein a portion of the matrix is stored in the first serial access memory, and the vector is stored in the second memory; and wherein the second memory is a random access memory.

9. A processing element comprising:

a central processing unit that computes inner products in a multiplication of a matrix and a vector;

a first serial access memory that stores matrix data having a first data storage capacity coupled to the central processing unit;

a second memory that stores vector data having a second data storage capacity coupled to the central processing unit;

a data input/output port having an internal data terminal and an external data terminal, wherein the internal data terminal is coupled to the first serial access memory and the second memory;

a communication controller having an internal control terminal and an external control terminal, wherein the internal control terminal is coupled to the central processing unit, the first serial access memory, and the second memory;

wherein the first data storage capacity is greater than the second data storage capacity;

wherein a portion of the matrix is stored in the first serial access memory, and the vector is stored in the second memory; and wherein the second memory is has a serial access port and a random access port.

10. A parallel processing device that performs a multiplication of a matrix and a vector, comprising:

a plurality of processing elements, wherein each processing element of the plurality of processing elements includes a central processing unit that computes inner products in a multiplication of a matrix and a vector, a first serial access memory that stores matrix data having a first data storage capacity coupled to the central processing unit, a second memory that stores vector data having a second data storage capacity coupled to the central processing unit, a data input/output port having an internal data terminal and an external data terminal, wherein the internal data terminal is coupled to the first serial access memory and the second memory, and a communication controller having an internal control terminal and an external control terminal, wherein the internal control terminal is coupled to the central processing unit, the first serial access memory, and the second memory;

a controller central processing unit having a controller CPU control signal input/output terminal and a controller CPU data input/output terminal;

a data bus; and a control bus;

wherein the controller CPU data input/output terminal is coupled to the data bus, and the controller CPU control signal input/output terminal is coupled to the control bus; and wherein the plurality of external data terminals are coupled to the data bus, and the plurality of external control terminals are coupled to the control bus.

11. A parallel processing device as in claim 10;

wherein the controller central processing unit uses the data bus and the control bus to load matrix data into each of the plurality of the first serial access memories, and to load vector data into each of the plurality of the second memories;

wherein each of the plurality of processing elements computes inner products in the multiplication of the matrix and the vector; and wherein each of the plurality of processing elements each use the data bus and the control bus to return the inner products to the controller central processing unit.

12. A parallel processing device that performs a multiplication of an 8×8 matrix and an 8-entry vector, comprising:

a first processing element including
a first central processing unit,
a first first serial access memory having a first data storage capacity coupled to the first central processing unit,
a first second memory having a second data storage capacity coupled to the first central processing unit,
a first data input/output port having a first internal data terminal and a first external data terminal, wherein the first internal data terminal is coupled to the first first serial access memory and the first second memory,
a first communication controller having a first internal control terminal and a first external control terminal, wherein the first internal control terminal is coupled to the first central processing unit, the first first serial access memory, and the first second memory, and
a first third high-speed random access memory that stores a program for the first central processing unit and intermediate and final inner product results;

a second central processing unit,
a second first serial access memory having the first data storage capacity coupled to the second central processing unit,
a second second memory having the second data storage capacity coupled to the second central processing unit,
a second data input/output port having a second internal data terminal and a second external data terminal, wherein the second internal data terminal is coupled to the second first serial access memory and the second second memory, a second communication controller having a second internal control terminal and a second external control terminal, wherein the second internal control terminal is coupled to the second central processing unit, the second first serial access memory, and the second second memory, and
a second third high-speed random access memory that stores a program for the second central processing unit and intermediate and final inner product results;

a third processing element including
a third central processing unit,
a third first serial access memory having the first data storage capacity coupled to the third central processing unit,
a third second memory having the second data storage capacity coupled to the third central processing unit,
a third data input/output port having a third internal data terminal and a third external data terminal, wherein the third internal data terminal is coupled to the third first serial access memory and the third second memory,
a third communication controller having a third internal control terminal and a third external control terminal, wherein the third internal control terminal is coupled to the third central processing unit, the third first serial access memory, and the third second memory, and
a third third high-speed random access memory that stores a program for the third central processing unit and intermediate and final inner product results;

a fourth processing element including
a fourth central processing unit, a fourth first serial access memory having the first data storage capacity coupled to the fourth central processing unit,
a fourth second memory having the second data storage capacity coupled to the fourth central processing unit,
a fourth data input/output port having a fourth internal data terminal and a fourth external data terminal, wherein the fourth internal data terminal is coupled to the fourth first serial access memory and the fourth second memory,
a fourth communication controller having a fourth internal control terminal and a fourth external control terminal, wherein the fourth internal control terminal is coupled to the fourth central processing unit, the fourth first serial access memory, and the fourth second memory, and
a fourth third high-speed random access memory that stores a program for the fourth central processing unit and intermediate and final inner product results;

a controller central processing unit having a controller CPU control signal input/output terminal and a controller CPU data input/output terminal;

a data bus; and a control bus;

wherein the first data storage capacity is greater than the second data storage capacity;

wherein the controller CPU data input/output terminal is coupled to the data bus, and the controller CPU control signal input/output terminal is coupled to the control bus;

wherein the first external data terminal, the second external data terminal, the third external data terminal, and the fourth external data terminal are each coupled to the data bus; and wherein the first external control terminal, the second external control terminal, the third external control terminal, and the fourth external control terminal are each coupled to the control bus.

13. A parallel processing device as in claim 12, wherein the controller central processing unit uses the data bus and the control bus to load matrix data into each of the plurality of the first serial access memories, and to load vector data into each of the plurality of the second memories;

wherein each of the plurality of processing elements computes inner products in the multiplication of the matrix and the vector; and wherein each of the plurality of processing elements each use the data bus and the control bus to return the inner products to the controller central processing unit.

14. A parallel processing device as in claim 13, wherein the controller central processing unit loads first and fifth 8-entry matrix rows into the first first serial access memory and loads the 8-entry vector into the first second memory;

wherein the controller central processing unit loads second and sixth 8-entry matrix rows into the second first serial access memory and loads the 8-entry vector into the second second memory;

wherein the controller central processing unit loads third and seventh 8-entry matrix rows into the third first serial access memory and loads the 8-entry vector into the third second memory; and wherein the controller central processing unit loads fourth and eighth 8-entry matrix rows into the fourth first serial access memory and loads the 8-entry vector into the fourth second memory.

* * * * *